United States Patent Office 3,034,901
Patented May 15, 1962

3,034,901
METHOD OF MAKING LOW SUGAR PECTINIC ACID GELS
Herbert T. Leo and Clarence C. Taylor, Anaheim, Calif., assignors to Mutual Citrus Products Company, Anaheim, Calif., a corporation of California
No Drawing. Filed Aug. 8, 1960, Ser. No. 47,961
5 Claims. (Cl. 99—132)

The present invention is directed to pectinic acid gels having a low sugar content, and to a method of making the same.

In previous applications and patents, we have described methods for making low sugar pectinic acids and methods of utilizing the same in the preparation of low sugar pectinic acid gels. In our Patent No. 2,801,178, issued July 30, 1957, we described a method of making a low sugar pectinic acid by the action of enzymes derived from citrus fruit peel on a pectin-aluminum coprecipitate, an acidic aqueous pectin concentrate, or a high methoxyl pectin initially in dry, discrete form, as the source material. These same materials are available for use in conjunction with the present method.

In the method described in Patent No. 2,801,178, a minimum methoxyl pectinic acid is produced that is not soluble in plain water but is easily dispersible therein. Upon the addition of a calcium sequestering agent, such as sodium hexametaphosphate, and of a solubilizing and buffering agent such as sodium citrate, the pectinic acid forms a solution which, upon adjustment of the pH thereof, forms gels with or without bivalent metal ions being present. With such minimum methoxyl pectinic acid solutions, it is possible to make gels such as jams, jellies, and desserts using a minimum amount of sugar, normally less than 50% by weight of the finished product. These low sugar gels are becoming more popular because they meet the exacting requirements of weight control diets and the rigid restrictions on sugar in a diet for diabetics.

Even with the relatively low sugar content present in these gels, however, the inclusion of substantial amounts of sucrose did not always give the desired texture, sometimes caused premature setting, and in some cases provided a sweet taste which was somewhat objectionable in jams made with tart berries.

We have now found that these problems can be eliminated by replacing at least a part of the sugar (sucrose) content of the jam with a corn syrup containing natural sugars. We particularly prefer to employ the type of syrup known commercially by the trademark "Karo" which is made by treating corn starch with hydrochloric acid, and neutralizing the acid after the inversion has taken place with calcium carbonate or milk of lime. While this process leaves a slight residue of calcium in the syrup, on the order of 70 parts per million, we have found that this trace of calcium is not only not detrimental but is actually beneficial to secure a proper texture in the gel.

The corn syrup which we have employed consists of a syrup containing about 75% soluble solids, with maltose, dextrine, and dextrose as the predominating sugars. These simple sugars do not have the same sweetness characteristics present in a similar volume of sucrose and furthermore, being present in the form of a syrup, the sweetening agent does not provide problems of granulation, or presetting of the jam.

In the process of making the gels of the present invention, no heat need be applied to the aqueous mass to be gelled, after the minimum methoxyl pectinic acid solution has been added thereto. The jellation occurs simply from the adjustment of the pH to the required value, a value between 2.75 and 4.00, and normally at a value of 2.75 to 3.35 through the agency of an edible acidic material such as lemon juice. This fact represents a substantial saving in time and trouble to the housewife.

An object of the present invention is to provide an improved process for the manufacture of gels from minimum methoxyl pectinic acid solutions.

A further object of the invention is to provide an improved method for the manufacture of low sugar gels which do not set up prematurely, and which require no boiling at any stage during their manufacture.

A further object of the present invention is to provide an improved method for the manufacture of low sugar gels containing sufficient sugars to provide adequate gelling characteristics, without being excessively sweet tasting.

In order that the invention may be completely understood, we are setting forth below the method of preparation of the minimum methoxyl pectinic acid as well as the method of making gels from the pectinic acid.

In the preferred process for the manufacture of the minimum methoxyl pectinic acid, the starting material is prepared from a pectin aluminum coprecipitate by liberating the pectin from the coprecipitate as described in our Patent No. 2,703,759, dated March 8, 1955. However, the dry high methoxyl pectin, instead of being ground to between 30 and 80 mesh as referred to in the patent, is preferably ground to the particle sizes of 30 mesh or coarser, such as between 10 and 30 mesh. The use of a relatively coarse material greatly facilitates the carrying out of the enzymic action in the subsequent processing steps, such as filtering.

The pectin may be recovered from lemon peel or orange peel, but the former is preferred.

The coprecipitation is carried out by adding a soluble aluminum salt to the pectin extract, and adjusting the pH to cause coprecipitation to occur. This complex comes out of solution as a curd, which is dropped into 40% alcohol to harden. After being hardened, the coprecipitate can be easily broken up into small pieces. The broken up pectin-aluminum complex is then washed with an acidified alcohol to remove a sufficient amount of aluminum, as aluminum hydroxide, so that the pectin is still not soluble but will disperse readily in plain water. An acidified alcohol having a pH of about 1.25 is particularly suitable for this purpose. After the last acidified alcohol wash, the pectin is brought to a somewhat higher pH, usually about 3.30 by the addition of ammonia to the final alcohol rinse. Then, the washed porous pectin is dried, and ground to the relatively coarse particle size desired.

The enzyme solution is prepared by first mixing together washed, comminuted orange peel, water, sodium chloride, sodium bicarbonate, and precipitated chalk at a temperature of about 90 to 120° F. in the following proportions:

*Table I*

| | |
|---|---|
| Water | gallons__ 660 |
| Peel | do____ 330 |
| Sodium chloride | pounds__ 100 |
| Sodium bicarbonate | do____ 10 |
| Chalk | do____ 5 |

The amount of sodium bicarbonate added is sufficient to neutralize the acidity in the peel to bring the pH to between 4 and 6, while the added chalk serves automatically to control the pH between about 6 and 7 during the several hours required to carry the enzymic action to completion. When the pH remains constant at about 6 without further addition of chalk, the reaction is considered complete. The pectase solution so produced is then drained or filtered from the peel and is ready for use in the treatment of the high methoxyl pectin.

The high methoxyl pectin, in a dry state, is added to the enzyme solution, prepared from orange peel in the manner described, and chalk and calcium chloride are added to give a mass having the following composition:

Table II 50 gals. of enzyme solution at about 130° F.
12 lbs. of high methoxyl pectin
4 lbs. of chalk
1 qt. of calcium chloride solution (25% by weight)

The enzymic reaction is carried out at a temperature of about 100 to 120° F., while agitating the mass violently at the early stages of the reaction. This high degree of agitation is necessary in order to disperse the high methoxyl pectin thoroughly. Thereafter, the mass is stirred, and any drop in pH below about 5.80 is made up by the addition of chalk, or chalk and a small proportion of sodium bicarbonate, so as to maintain the pH at about 6 or between about 6 and 7.

After the enzymic action is complete, which requires up to about 6 hours, the suspension is pumped into a porous, double-walled unit having holes sufficiently fine to prevent mechanical losses in pectin. The pectin retained in the unit is washed with water to remove excess chalk. Thereafter, the pectin is dropped into an agitator tank containing acidified 80 to 90% isopropyl alcohol, or other suitable alcohol, and the minimum methoxyl pectinic acid is recovered by filtering or draining, re-mixing the minimum methoxyl pectinic acid with unacidified 90% alcohol until the pH of the alcohol medium has been raised to about 2 to 2.5, and finally treating a dispersion of the minimum methoxyl pectinic acid in 90% alcohol with sufficient ammonia, in the form of a water solution, to bring the pH of the pectinic acid to between 3 and 4. The pH should not be raised higher than 4 since the resulting minimum methoxyl pectinic acid will then be so water soluble that it will clump badly when added to water. If the pH of the recovered pectinic acid is below about 3, there is a tendency for it to be degraded during the subsequent drying operation.

When the pH of the final alcohol dispersion has been brought to a pH of between 3 and 4, the minimum methoxyl pectinic acid is in a relatively firm, coarsely particulate form that renders it easy to filter. The filtering is carried out preferably on a gravity type filter without the use of applied pressure. After filtering, the mass is then dumped into a vacuum drier provided with a slowly revolving agitator and dried free of alcohol under reduced pressure at a relatively low temperature below the normal boiling point of the alcohol. The dried product is then carried out of the drier, preferably in a stream of air, and then passed to a centrifugal separator from which the powdered pectinic acid is recovered in a dry, loosely pulverent state. It is then passed through a grinding mill and screened to the desired degree of fineness. A perfectly white powder is thus obtained.

In making up the composition for home use, we combine the minimum methoxyl pectinic acid with an alkali metal salt of an edible organic oxy acid, an alkali metal hexametaphosphate, and with a sugar. Specifically, we prefer to use a combination of potassium citrate, sodium hexametaphosphate, and anhydrous dextrose. Generally, the amount of the potassium citrate will be on the order of 10 to 100% by weight of the dry pectinic acid, while the sodium hexametaphosphate will be added broadly in the range from 5 to 75% by weight of the pectinic acid. A particularly preferred formula has the following ingredients:

Table III

| | Percent |
|---|---|
| Minimum methoxyl pectinic acid | 11 |
| Potassium citrate (30 mesh) | 8 |
| Powdered sodium hexamethaphosphate | 6 |
| Anhydrous dextrose (30 mesh) | 75 |

When one and one quarter ounces of the above recited mix are dissolved in one cup of ordinary tap water, a pectin solution results with a pH value ranging from 4.9 to 5.5, and usually between 4.9 and 5.20.

In making up the gels of the present invention, the first step consists in crushing the fruit and then adding the water solution of the pectin, with a pH of 4.90 to 5.50 to the fruit and mixing well. Then, the appropriate amounts of sugar and corn syrup are added either individually or jointly. Finally, sufficient lemon juice or other edible acidic material is added to bring the pH to a value between 2.75 and 4.00 to thereby effect gelling.

A typical composition employed for the manufacture of a jam is given in the following table:

Table IV

| | Kettle batch, oz. | Soluble solids, oz. |
|---|---|---|
| 2 cups fresh fruit | 16 | 1.60 |
| 1 cup liquid pectin | 9.25 | 1.25 |
| 1 cup sugar | 7.00 | 7.00 |
| 1 cup corn syrup | 12.00 | 9.00 |
| ⅓ cup lemon juice | 3.00 | 0.50 |

The pH value of the gel was about 3.50. The total soluble solids consitituted 40.9% of the composition. It is important to keep the soluble solids content at a maximum of 52% by weight, because at higher soluble solids contents, granulation of the jam, or presetting of the jam, or syneresis of the jam may occur.

Another suitable recipe for making jams from frozen berries is given in the following table:

Table V

| | Kettle batch, oz. | Soluble solids, oz. |
|---|---|---|
| 2 10 oz. packages of frozen berries | 20 | 5.00 |
| 1 cup liquid pectin | 9.25 | 1.25 |
| 1 cup sugar | 7.00 | 7.00 |
| 1 cup corn syrup | 12.00 | 9.00 |
| ⅓ cup lemon juice | 3.00 | 0.50 |

The above composition had a pH of 3.35, and a total soluble solids content of 44%.

The following composition is suitable for making jams from syrup packed fruit:

Table VI

| | Kettle batch, oz. | Soluble solids, oz. |
|---|---|---|
| 16 oz. can of fruit | 16 | 4.00 |
| 1 cup liquid pectin | 9.25 | 1.25 |
| 1 cup sugar | 7.00 | 7.00 |
| 1 cup corn syrup | 12.00 | 9.00 |
| ⅓ cup lemon juice | 3.00 | 0.50 |

This gel had a pH of 3.50 and contained 46% soluble solids.

In each case, the gels produced had a fine texture, evidenced no granulation, and did not preset in the kettle. The addition of the corn syrup also provided a noticeable decrease in the tendency toward syneresis or exudation of liquid from the gel.

It will be understood that modifications and variations may be effected without departing from the scope of the novel concepts of the present invention.

We claim as our invention:

1. The method of making a gel from a minimum methoxyl pectinic acid formed from pectin obtained from citrus peel by the action of a citrus peel-derived pectase carried to completion which comprises providing an aqueous solution of said pectinic acid in combination with an alkali metal salt of an edible organic oxy acid, an alkali metal hexametaphosphate, and a sugar, said solution having a pH between 4.9 and 5.5, adding said solution to a mass of edible material to be gelled, adding to the resulting mixture a combination of a particulated sugar and a corn syrup containing natural sugars, and adjusting the pH of the resulting mixture to a value between 2.75 and 4.00 by the addition of an edible acidic material to effect gelling thereof, said pectinic acid being the sole pectinic component present in the gelling agent.

2. The method of making a gel from a minimum methoxyl pectinic acid formed from pectin obtained from citrus peel by the action of a citrus peel-derived pectase carried to completion which comprises providing an aqueous solution of said pectinic acid in combination with an alkali metal salt of an edible organic oxy acid, an alkali metal hexametaphosphate, and a sugar, said solution having a pH between 4.9 and 5.5, adding said solution to a mass of edible material to be gelled, and adding to the resulting mixture a combination of a particulated sugar and a corn syrup containing natural sugars, and adjusting the pH of the resulting mixture to a value between 2.75 and 4.00 by the addition of an edible acidic material to effect gelling thereof, the mixture at gelation having a soluble solids contents not in excess of 52% by weight, said pectinic acid being the sole pectinic component present in the gelling agent.

3. The method of making a gel from a minimum methoxyl pectinic acid formed from pectin obtained from citrus peel by the action of a citrus peel-derived pectase carried to completion which comprises providing an aqueous solution of said pectinic acid in combination with an alkali metal salt of an edible organic oxy acid, an alkali metal hexametaphosphate, and a sugar, said solution having a pH between 4.9 and 5.5, adding said solution to a mass of edible material to be gelled, adding to the resulting mixture a combination of substantially equal amounts by volume of a particulated sugar and a corn syrup containing natural sugars, and adjusting the pH of the resulting mixture to a value between 2.75 and 4.00 by the addition of an edible acidic material to effect gelling thereof, said pectinic acid being the sole pectinic component present in the gelling agent.

4. The method of making a gel from a minimum methoxyl pectinic acid formed from pectin obtained from citrus peel by the action of a citrus peel-derived pectase carried to completion which comprises providing an aqueous solution of said pectinic acid in combination with an alkali metal salt of an edible organic oxy acid, an alkali metal hexametaphosphate, and a sugar, said solution having a pH between 4.9 and 5.5, adding said solution to a mass of fruit substance to be gelled, adding to the resulting mixture a combination of a particulated sugar and a corn syrup containing natural sugars, and adjusting the pH of the resulting mixture to a value between 2.75 and 4.00 by the addition of an edible acidic material to effect gelling thereof, said pectinic acid being the sole pectinic component present in the gelling agent.

5. The method of making a gel from a minimum methoxyl pectinic acid formed from pectin obtained from citrus peel by the action of a citrus peel-derived pectase carried to completion which comprises providing an aqueous solution of said pectinic acid in combination with potassium citrate, sodium hexametaphosphate, and a sugar, said solution having a pH between 4.9 and 5.5, adding said solution to a mass of edible material to be gelled, adding to the resulting mixture a combination of a particulated sugar and a corn syrup containing natural sugars, and adjusting the pH of the resulting mixture to a value between 2.75 and 4.00 by the addition of an edible acidic material to effect gelling thereof, said pectinic acid being the sole pectinic component present in the gelling agent.

References Cited in the file of this patent

UNITED STATES PATENTS

| | | |
|---|---|---|
| 2,824,007 | Leo et al. | Feb. 18, 1958 |
| 2,876,101 | Bliudzius et al. | Mar. 3, 1959 |